July 26, 1932.  W. E. HOLLAND  1,869,258
BATTERY VENT CONSTRUCTION
Filed Feb. 11, 1925
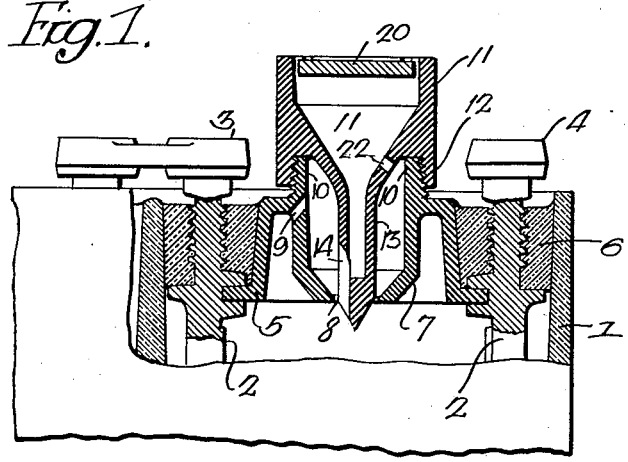
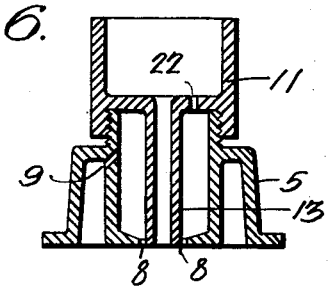
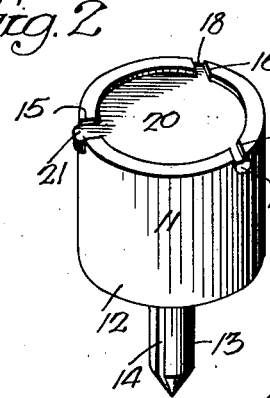
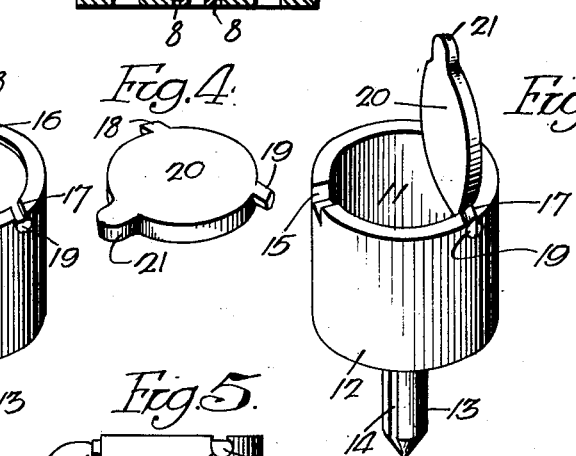
Inventor.—
Walter E. Holland.
by his Attorneys.—

Patented July 26, 1932

1,869,258

UNITED STATES PATENT OFFICE

WALTER E. HOLLAND, OF PHILADELPHIA, PENNSYLVANIA, ASSIGNOR TO PHILADELPHIA STORAGE BATTERY COMPANY, OF PHILADELPHIA, PENNSYLVANIA, A CORPORATION OF PENNSYLVANIA

BATTERY VENT CONSTRUCTION

Application filed February 11, 1925. Serial No. 8,462.

My invention relates to storage batteries, and one of the objects of my invention is to provide an improved form of battery-cover vent by means of which spray from the escaping gases is condensed and drained back into the battery cell.

Another object of the invention is to provide a battery vent construction including means whereby water may be added to a battery cell through the vent structure, so that any electrolyte tending to creep out over the vent surfaces is washed back.

A further object of the invention is to provide a battery construction whereby danger of acid or other corrosive electrolyte dripping from a removed filler plug is avoided by use of a novel type of filler device which need never be removed.

In the attached drawing:

Figure 1 is a fragmentary sectional view of a battery equipped with a device made in accordance with my invention;

Fig. 2 is a view in perspective of the filler vent element with the cover plate in the closing position;

Fig. 3 is a view in perspective of the filler vent element with the cover plate elevated;

Fig. 4 is a view in perspective of the cover plate detached;

Fig. 5 is a side elevation illustrating clearly the hinging device whereby the filler cap is prevented from being displaced when in the closed position, but may be easily detached when elevated from the filler vent element, and Fig. 6 is a transverse section through a cover member showing a modification within the scope of the invention.

It is customary in battery construction to provide the necessary vents for the cells in the filler caps, although it is entirely obvious that the same practical results may be obtained by employing an unvented filler cap and establishing a vent in some other part of the upper portion of the battery. In the present instance, I do not depart from the general custom of combining the vent and the filler element, but I so construct the said element that it may become an integral part of the battery, it being unnecessary, in order to introduce water or electrolyte, to remove this part. Largely the invention resides in a combined venting and filling means, although it will be obvious that in some aspects the invention does not depend upon this union, since the filling means is capable of use independently of the vent. The greater usefulness of the device, however, depends upon the combination.

Referring to the drawing, I have illustrated in Fig. 1 a portion of a battery comprising the usual container 1 which holds the electrolyte and houses the battery plate elements. From the plate connecting straps 2, terminals 3 and 4 of opposite polarity extend upwardly through the sealing compound 6 forming part of the cover of the container. This cover consists in the present instance of an element 5 which interlocks with grooved portions of the plate connecting straps 2, and in the annular recess between this element 5 and the walls of the container I place a sealing compound 6.

The cover element 5 is formed, as clearly illustrated, with an annular depending flange 7 shaped to form a restricted opening 8 at the bottom, and having near the top thereof a vent port 9 which establishes communication between the interior of the container 1 and the space or chamber surrounded by the said annular flange 7. The element 5 also comprises an upstanding annular flange 10 threaded externally for reception of a substantially funnel-shaped member 11 provided with a depending internally-threaded flange 12 which coacts with the said flange 10 to secure the member 11 to the element 5. In order to form a better seal, the threaded portions and the flat contacting surfaces of the flange 10 and the member 11 may be coated with vaseline or other suitable grease or oil. The member 11 extends downwardly in the form of a hollow stem 13 whose lower pointed end projects through the restricted aperture 8 in the lower terminating wall of the flange 7, and a slot 14 extending upwardly from the beveled lower edge of the said stem 13 forms a vent for the interior of the funnel. It will be noted that the interior passage of the stem 13 terminates short of the lower attenuated end, and that the slot 14 intersects the side wall of the passage to form in effect an offset continuation of the latter.

The member 11 is provided at its top with three recesses 15, 16 and 17, the latter two recesses constituting bearings for trunnions 18 and 19 of a lid or closure member 20, the latter fitting the top of the member 11, as clearly illustrated in Figs. 1 and 2, and having on the side opposite the trunnions 18 and 19 a peripheral lip 21 which occupies the recess 15 in the member 11 when the lid is down, and projects beyond the outer surface of the side member 11 to provide a finger-hold for raising the lid.

Attention is called to the irregular shape of the recesses 16 and 17, as best shown in Fig. 5, one side of the recess being undercut and the trunnions 18 and 19 being correspondingly formed whereby when the lid is closed the trunnions cannot be displaced from their bearing. The trunnions 18 and 19, however, are made flat the top so that when the lid is elevated, as shown in Fig. 3, the trunnions may be withdrawn through the top of the recesses which they occupy.

The member 11, as shown in Fig. 1, is also provided with a port 22, which establishes communication between the chamber formed by the flanges 10 and 7 and the inside of the funnel member 11, and it will be understood that the lid 20 while being sufficiently close fitting in the top of the member 11 to effectively exclude dirt, is not sufficiently close to prevent passage of air or other gas either way.

Although I have shown the member 11 detachable from the element 5, it will be understood that these parts may be integral without departure from the invention. With the present construction, the member 11 is intended to be secured in place, and thereafter not removed, such removal being unnecessary for introducing water into the cell. When water is to be introduced, the lid 20 may be elevated, as shown in Fig. 3, and the water poured into the top of the member 11 without difficulty and with slight danger of spilling over onto the top of the container. The water passing down through the funnel escapes through the channel 14 and runs off the lower pointed end of the stem 13 into the cell, the gas venting through the apertures 9 and 22 as the water is introduced.

The construction of this filler-vent has been found particularly effective and efficient in operation, the venting of the gas when water is introduced being free and the entrance of the water into the cell accordingly without congestion. It is clear that the device obviates the necessity for the usual detachable filler cap and thereby avoids the possibility, so objectionable in radio batteries, of the electrolyte dripping from the detached cap onto the rugs, draperies or furniture. As also previously stated, the vent construction described largely eliminates the possibility of water escaping onto the cover of the cell where it may creep and coat the sides of the battery and may cause leakage current to pass between the battery terminals. Although the form of the device practically precludes the escape of moist spray from the cell when the battery gases, owing to the fact that the spray condenses on the surfaces and drains down and off the pointed lower end of the stem 13, it is obvious that any of the electrolyte which might creep or be carried into the funnel will be washed back into the battery upon the addition of water to the cells.

In this connection, it will be noted that the stem 13 at its lower end fits more or less closely within the opening 8 and that the slot 14 is quite narrow. Preferably the dimensions are such as to permit a film of moisture or the electrolyte to form and seal the slot 14 and the space between the stem and the flange 7. Under these circumstances, gas or spray tending to escape from within the container must pass first through the port 9 into the chamber surrounded by the flange 7 where its velocity of flow is reduced and it expands, thus depositing a large part of its moisture content on the walls, the moisture passing back to the interior of the container through the slot 14 and the opening 8 and helping to maintain the liquid seal at these openings. The gas then passes through the port 22, again expanding into the interior of the funnel member 11 and depositing the remainder of its moisture content on the interior surface of the latter, the moisture passing down through the stem 13 and into the container. In this manner, a double expansion of the gas is provided for in spaces or chambers whose walls may receive the separated moisture and pass it back to the container.

Obviously, the device is subject to considerable modification without departure from the various essential features of the invention. One modification I have shown in Fig. 6, the slot 14 being eliminated and the stem 13 being left entirely open at the bottom. In this instance, while the funnel-shape of the member 11 is generally maintained, the inner surface is not tapered toward the stem. Also, in this instance, the cover 20 is eliminated.

I claim:

1. An electric battery container comprising a cover element including an annular depending flange the lower edges of which form a restricted opening, said flange being apertured near its upper end, and a funnel part having its lower attenuated end extending down into the space surrounded by said flange and into the restricted opening at the bottom, said funnel part comprising also a port extending from the inner face thereof to the space surrounded by said flange.

2. An electric battery container having a port, undercut recesses in the container at the top of said port, and a lid element having trunnions journaled in said recesses, said trunnions being flat at one side whereby in the elevated position of the lid the trunnions may be withdrawn from the recesses.

3. An electric battery comprising a container, a cover for the container, and a substantially funnel-like part mounted in the cover with its lower attenuated end portion extending into the container, the interior chamber of said funnel terminating short of the bottom of said end portion and the latter having a slot in the outer surface thereof intersecting the side wall of said chamber and terminating in the said attenuated extremity.

4. An electric battery comprising a container, a cover for the container, and a depending tubular part constituting a filling port and having its inner passage stopping short of the lower end, and having also a longitudinal slot at the lower end and in the outer surface thereof, said slot intersecting the side wall of said inner passage and forming an offset continuation thereof into the container.

5. An electric battery comprising a container, a cover for the container and a depending tubular part constituting a filling port and having its inner passage stopping short of the lower end, and having also a longitudinal slot extending upwardly from the lower extremity of said depending part and intersecting the side wall of said passage to form an offset outlet therefrom into the container.

6. An electric battery comprising a container, a cover for the container, and a depending tubular part constituting a filling port and having its inner passage stopping short of its lower pointed end, and having also a narrow slot extending upwardly from a point adjacent the tip of said lower end and communicating with said passage to form an outlet therefrom into the container.

7. An electric battery comprising a container, a cover for the container including a funnel-like part having a depending tubular part with its inner passage stopping short of the lower end, and having also a longitudinal slot at the lower end intersecting the side wall of said passage and forming an offset continuation of the passage into the container.

8. An electric battery container comprising a cover element having a depending annular flange with a restricted opening at the bottom thereof, and a filling tube carried by the cover and projecting downwardly through said opening, said tube having its inner passage stopping short of the lower end thereof and having also in that part which passes through said flange opening an external narrow slot communicating with the said inner passage to form an outlet therefrom into the container.

9. An electric battery container comprising a cover element having a depending annular flange with a restricted opening at the bottom thereof, a funnel like part in said cover including a depending tubular part projecting downwardly through said restricted opening, said tube having its inner passage stopping short of the lower end thereof and having also in that part which passes through said flange opening an external narrow slot communicating with the said inner passage to form an outlet therefrom into the container.

10. A filling and venting structure for electric batteries including a chamber having a drain hole at the bottom and a port above the bottom both opening into said container, said chamber having a third port also above the bottom and opening to the outside of the container, and a filling tube projecting downwardly into said chamber and partially obstructing said drain hole, said tube having its inner passage stopping short of the lower end thereof and having also in that part which passes through said drain hole an external narrow slot communicating with the said inner passage to form an outlet therefrom into the container.

WALTER E. HOLLAND.